(12) United States Patent
Boerjesson et al.

(10) Patent No.: US 11,943,707 B2
(45) Date of Patent: *Mar. 26, 2024

(54) PACKET DATA NETWORK GATEWAY REDIRECTION

(71) Applicant: KORE Wireless Group, Inc., Atlanta, GA (US)

(72) Inventors: Jonas Mikael Boerjesson, Oakland, CA (US); Evan Cummack, San Francisco, CA (US)

(73) Assignee: KORE Wireless Group, Inc., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/847,841

(22) Filed: Jun. 23, 2022

(65) Prior Publication Data

US 2022/0322223 A1    Oct. 6, 2022

Related U.S. Application Data

(63) Continuation of application No. 16/985,767, filed on Aug. 5, 2020, now Pat. No. 11,399,339.

(51) Int. Cl.
| | |
|---|---|
| *H04W 48/18* | (2009.01) |
| *H04W 4/029* | (2018.01) |
| *H04W 16/18* | (2009.01) |
| *H04W 16/22* | (2009.01) |
| *H04W 36/14* | (2009.01) |
| *H04W 36/30* | (2009.01) |

(Continued)

(52) U.S. Cl.
CPC ......... *H04W 48/18* (2013.01); *H04W 4/029* (2018.02); *H04W 16/18* (2013.01); *H04W 16/22* (2013.01); *H04W 36/14* (2013.01); *H04W 36/30* (2013.01); *H04W 36/32* (2013.01); *H04W 84/12* (2013.01)

(58) Field of Classification Search
CPC ..... H04W 48/18; H04W 4/029; H04W 16/18; H04W 16/22; H04W 36/14; H04W 36/30; H04W 36/32; H04W 84/12; G01C 21/3461

See application file for complete search history.

(56) References Cited

U.S. PATENT DOCUMENTS 9,002,634 B1 *  4/2015  Kalyanasundaram ..................... G01C 21/3461 709/203
10,848,936 B2 *  11/2020  Bhaskaran ............ H04W 76/14

(Continued)

*Primary Examiner* — Marcos L Torres
(74) *Attorney, Agent, or Firm* — Schwegman Lundberg & Woessner, P.A.

(57) ABSTRACT

A core provider predicts that a device will enter an area of poor coverage by a wireless network provider. Based on the prediction, one or more rules are applied to prioritize data traffic to be received prior to entering the area of poor coverage. The prediction that the device will enter the area of poor coverage may be based on cell coverage data received from the wireless network provider, connection quality data received from other devices, a location of the device, a speed of the device, a direction of the device, or any suitable combination thereof. A route of the device may be changed to avoid or minimize an amount of time in the area of poor coverage. As another alternative, the device may be switched from the wireless network provider to another wireless network with better coverage.

20 Claims, 12 Drawing Sheets

(51) Int. Cl.
*H04W 36/32* (2009.01)
*H04W 84/12* (2009.01)

(56) References Cited

U.S. PATENT DOCUMENTS

2014/0095943 A1* 4/2014 Kohlenberg ............ H04L 65/40
714/E11.179
2021/0112423 A1* 4/2021 Maheshwari ......... H04W 36/32

* cited by examiner

PACKET DATA NETWORK GATEWAY REDIRECTION

CLAIM OF PRIORITY

This Application is a Continuation of and claims the benefit of priority to U.S. application Ser. No. 16/985,767, filed Aug. 5, 2020, which is hereby incorporated by reference in its entirety.

TECHNICAL FIELD

This invention relates generally to wireless networking, and more specifically to a new and useful system and method for packet data network gateway redirection in wireless networking.

BACKGROUND

Wireless networking service providers provide different levels of coverage in different areas or at different times. As a user moves among coverage areas or as networking components come on- or off-line, the quality of service provided by a particular networking service provider varies. At certain times or locations, the quality of service may fall below an acceptable threshold, resulting in a service outage.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

A core provider predicts that a device (e.g., an Internet of things (IoT) device) will enter an area of poor coverage by a wireless network provider (also referred to as a wireless network carrier). Based on the prediction, one or more rules are applied to prioritize data traffic to be received prior to entering the area of poor coverage. For example, the device may be a car and, prior to entering the area of poor coverage, map data is prioritized to be downloaded to the car over other data, such as streaming music. As a result, the map data will be available locally to the device in the area of poor coverage, though the streaming music may become unavailable prior to entering the area of poor coverage due to being deprioritized, while connectivity exists.

The prediction that the device will enter the area of poor coverage may be based on cell coverage data received from the wireless network provider, connection quality data received from other devices, a location of the device, a speed of the device, a direction of the device, or any suitable combination thereof. The location of the device may be based on the base station to which the device is connected. The speed, direction, or both of the device may be based on a rate of handovers between base stations by the device.

In addition to or instead of prioritizing data before entering an area of poor coverage, a route of the device may be changed to avoid or minimize an amount of time in the area of poor coverage. For example, a route selection algorithm may treat the area of poor coverage as impassable, causing a route that avoids the area to be selected. As another example, a route selection algorithm may treat the area of poor coverage as being slower to traverse (e.g., by doubling the predicted travel time through the area of poor coverage) when generating a route, causing a route that passes through the area to be selected only if a substantial time savings results.

In some example embodiments, an area of poor coverage on one wireless network is also an area of adequate coverage on another wireless network. Thus, a prediction of poor coverage on a current wireless network of a device may be the basis for switching to another wireless network. A cost function may be assigned to the switch and used as part of a pathing algorithm for the device. Thus, a first path that passes through an area of poor coverage may be compared with a second path that avoids the area of poor coverage and a third path that passes through the area of poor coverage but switches wireless networks to compensate. Based on the cost functions of the physical paths, the time spent in an area of low coverage, and the switching of the wireless network, an optimal path is selected for the device.

Figure 1:
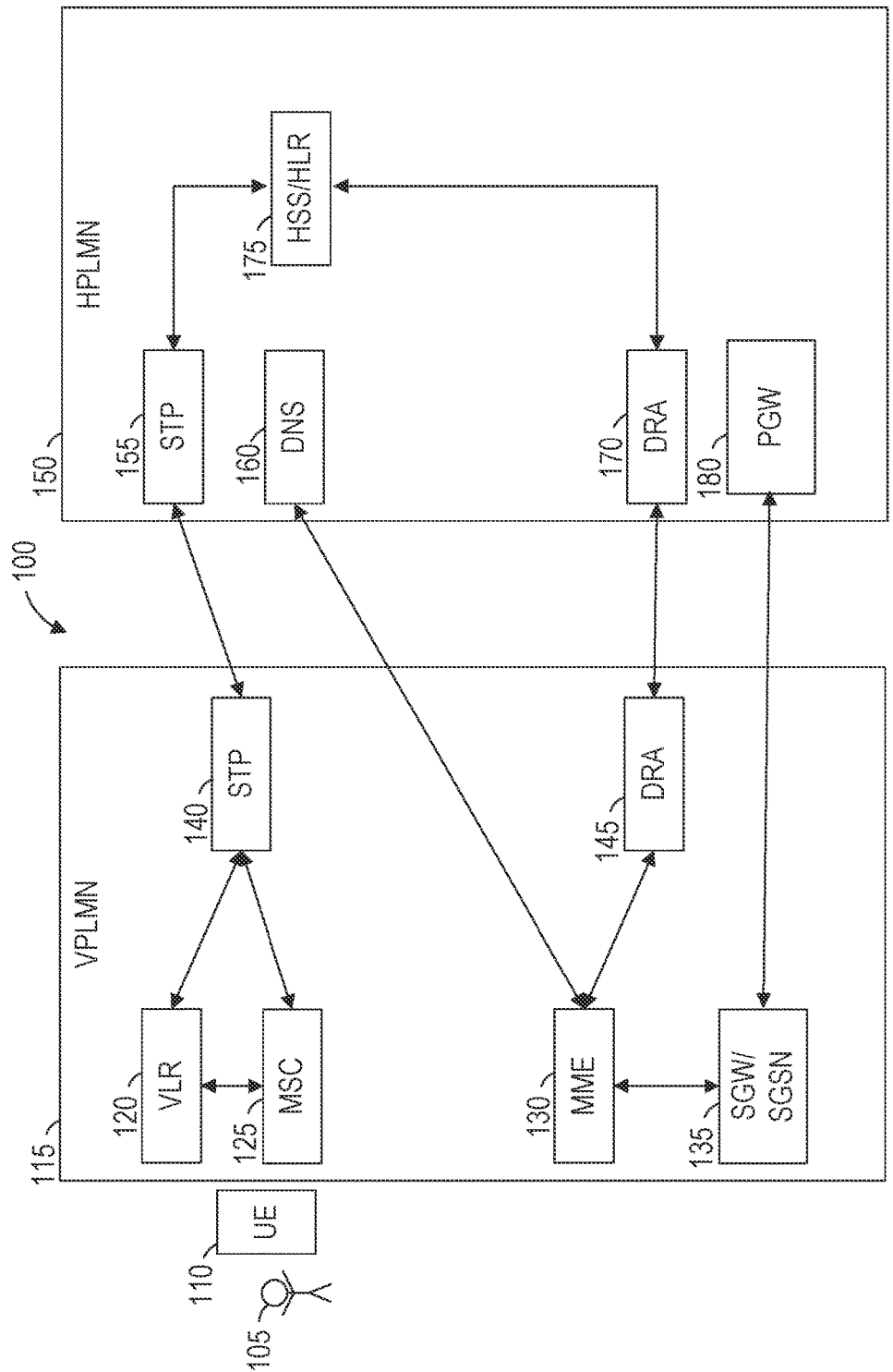
FIG. 1 is an architecture diagram showing communication paths between a user endpoint and a home public land mobile network, according to some example embodiments.

FIG. 1 is an architecture diagram 100 showing communication paths between a user endpoint (UE) 110 and a home public land mobile network (HPLMN) 150, according to some example embodiments. The UE connects to a visited public land mobile network (VPLMN) 115. The VPLMN 115 connects to the HPLMN 150. When a user is not in their home area (generally referred to as "roaming), the VPLMN 115 is a network to which the UE 110 connects but is distinct from the HPLMN 150 to which the UE 110 is subscribed.

When the user 105 is not roaming, the UE 110 connects directly to the HPLMN 150, without connecting to a separate VPLMN 115. In this case, the devices and services described as being in the VPLMN 115 are instead performed by the HPLMN 150.

The HPLMN 150 has information about the UE 110 such as which services are associated with the UE 110, which networks around the world the device is allowed to roam over, whether the account is currently paid up, or any suitable combination thereof. The HPLMN 150 may, based on local policy, deny access to the network over which the UE 110 is roaming. When the UE 110 comes online, it registers with the HPLMN 150. The registration data includes information such as the network over which the device is connecting (e.g., AT&T North America or Telefonica Spain), the radio access technology used (e.g., 3G or 4G), and information about the hardware (e.g., the international mobile equipment identity (IMEI) of the UE 110). An IMEI uniquely identifies the hardware of the UE 110 and thus can be used to lookup characteristics of the UE 110 in a database.

The VPLMN 115 includes a visitor location register (VLR) 120. The VLR 120 is a database associated with a mobile switching center (MSC) 125. The VLR 120 stores the location of the mobile devices in the service area of the MSC 125. Typically, each MSC has its own VLR. Thus, FIG. 1 shows the MSC 125 to which the UE 110 is connected, but the VPLMN 115 typically comprises multiple MSCs and their corresponding VLRs. The signal transfer point (STP) 140 receives data from the MSC 125 and communicates with the STP 155 of the HPLMN 150 to achieve inter-network communication. The STP 140 serves as a load balancer for 2G and 3G connections.

The VPLMN 115 also includes a mobility management entity (MME) 130 connected to a serving gateway (SGW)/ serving general packet radio service (GPRS) support node (SGSN) 135. The SGW/SGSN 135 connects to the packet serving gateway (PGW) 180 (e.g., via a direct cable connection between servers on a rack in a colocation facility, via an IP exchange (IPX) connection, via a VPN connection, or any suitable combination thereof). The MME 130 also connects to the Diameter routing agent (DRA) 170 and a domain name server (DNS) 160 of the HPLMN 150.

The VLR 120, MSC 125, and STP 140 service 2G and 3G connections from the UE 110. The MME 130, SGW/SGSN 135, and DRA 145 service 4G and long-term evolution (LTE) connections from the UE 110. The MME 130 is responsible for UE paging and transmission procedures. The MME 130 selects the SGW for a UE at the time the UE attaches to the VPLMN 115. The 130 also provides the control plane function for mobility between LTE and 2G/3G access networks. The DRAs 145 and 170 are functional elements in a 3G or 4G network that provide real-time routing capabilities to ensure that messages are routed correctly. The DRAs 145 and 170 serve as load balancers for connections using the Diameter protocol (e.g., 4G and LTE connections).

A home subscriber server (HSS)/home location register (HLR) 175 is also part of the HPLMN 150. The HSS/HLR 175 comprises a database that contains information about each device that is authorized to use the global system for mobile communications (GSM) core network. The HSS/HLR 175 stores data for each subscriber identity module (SIM) card issued by the HPLMN 150. Each SIM card has a unique international mobile subscriber identity (IMSI) that is used as a primary key to retrieve data for a device.

In some example embodiments, the UE 110 (e.g., a phone) sends an attach request to a base station, which will, usually through configuration, connect to the MME 130. The MME 130 identifies the IMSI of the UE 110. The UE 110 may send a temporary mobile subscriber identity (TMSI) or a globally unique temporary identifier (GUTI) instead of an IMSI. In that case, the MME 130 determines the IMSI based on the received IMSI/GUTI or requests the IMSI from the UE 110.

Once the IMSI has been obtained, the MME 130 may have to clean up any old sessions if this was a re-attachment. Then, the MME 130 contacts the subscriber's HSS/HLR 175 in order to perform authentication. The HSS may be configured directly in the MME 130.

After authentication, the MME 130 sends an Update Location Request (ULR). This request will typically go through several DRAs and Diameter edge agents (DEAs)) on the way to the final destination. For example, the VPLMN 115 may have the MME 130 connect through the DRA 145, which has a peer connection with the DRA 170 of the HPLMN 150.

The request will arrive at the DRA 170 of the HPLMN 150, which is configured to route requests (e.g., through a VPN tunnel or an IPX connection) to the destination. Voice over IP (VoIP) traffic can be carried over the public internet or private IPX networks. By using a private network, service is unaffected by unrelated congestion on the internet, helping service providers meet quality of service (QoS) guarantees. Some providers dynamically determine whether to connect using a VPN over the internet or to connect using an IPX connection based on latency or throughput of one or more both connections. For example, a higher cost associated with an IPX connection may be incurred only when the performance gain (compared with using the internet) exceeds a predetermined threshold.

The ULR will eventually arrive at the HSS/HLR 175, being run by the HPLMN 150. In response to receiving the ULR, the HSS/HLR 175 may optionally allocate the PGW 180 for the GPRS tunneling protocol (GTP) traffic and, if so, that information will be included in the Update Location Answer (ULA) sent back to the UE 110. The PGW address may be included in the public data network (PDN) context sent back as part of the ULA. After handling the ULR, the HSS/HLR 175 sends back a ULA. The ULA is routed back through the DRAs 145 and 170.

The ULA includes the IMSI and the access point name (APN) of the ULR, the identifier of the PGW 180 through which the GTP tunnels will go, and a QoS profile for the connection.

The ULA will be processed by the MME 130, which will select the PGW 180 (or another PGW). The MME 130 will also choose the SGW/SGSN 135, which will be the same SGW for all hearers that will be allocated for the UE. This is unlike PGW where different bearers for different APNs may go through different PGWs. The ULA contains a set of APNs that the IMSI is allowed to use. The MME 130 compares the set of APNs in the ULA with a set of APNs received from the UE. If there is an intersection between the two sets, the MME 130 selects an APN from the intersection. If there is no intersection between the two sets, the MME 130 rejects a request to connect using 4G and instead creates a 3G connection.

Finally, the MME 130 will construct a Create Session Request and send it to the SGW/SGSN 135. The Create Session Request includes any one or more of the IMSI of the UE 110, an evolved packet system (EPS) bearer id, the APN the user is subscribing to, the IP address of the PGW 180 that the MME 130 selected for this EPS Session, a QoS profile, an evolved universal terrestrial radio access network (E-UTRAN) cell global identifier (EGCI) for the cell in which the UE 110 is located, and a tracking area identity (TAI) for the tracking area in which the UE 110 is located.

The SGW/SGSN 135 will process the Create Session request, create a tunnel endpoint identifier (TEID) for the downlink tunnel, and send a Create Session Request to the PGW 180 whose IP was selected by the MME 130 and is part of the request the SGW/SGSN 135 received from the MME 130. If a PGW has not already been selected (e.g., by the HSS/HLR 175), the MME 130 selects a PGW by resolving the APN.

The Create Session Request includes: the IMSI, the EPS bearer ID, the downlink TEID, the APN, the QoS profile, the ECGI, and the TAI. In response to the Create Session Request, the PGW 180 allocates an IP address for the UE 110 and notifies the policy and charging rules function (PCRF), which will look up the user access profile, verify that the user is allowed to create a new bearer and if all is well, return that policy to the PGW 180.

When the PGW 180 receives the access policy from the PCRF, it will apply those policies to the UE 110. The PGW 180 will also allocate a TEID for the downlink tunnel back to the SGW/SGSN 135. Finally, the PGW 180 will send back a Create Session Response, which will include: the IP address for the UE 110, the EPS Bearer ID, the uplink TEID, and the authorized QoS profile. The Create Session Response will then propagate back to the MME 130, which then will allocate a TEID for the uplink, which goes to the base station, which will talk to the UE 110 and eventually the attach completes whereby a Modify Bearer Request happens between the MME 130 and SGW/SGSN 135 to setup the downlink tunnel and finally, the GTP user (GTP-U) tunnels have been established.

After the UE 110 is registered, additional signaling data is used for establishing and maintaining data connections (e.g., a PDN for a 4G connection or a packet data protocol (PDP) context for a 3G connection). The signaling data for establishing these data "tunnels" includes information about the cell information (e.g., a tracking area, a cell identifier, or both), which gives a rough estimate of where the device is in the physical world. The signaling data also, in some example embodiments, includes the radio access technology used (e.g., whether the connection is 3G, 4G, or 5G). As the device moves from one base station to the next, it's session will be handed over to the next base station and, typically, a request to modify the session will be sent to the HPLMN 150. The request contains the updated information (new cell identifier, etc.). Since each cell identifier can be mapped to a physical location, the rate at which these updates occur can provide an indication of the speed and direction of the device.

Figure 2:
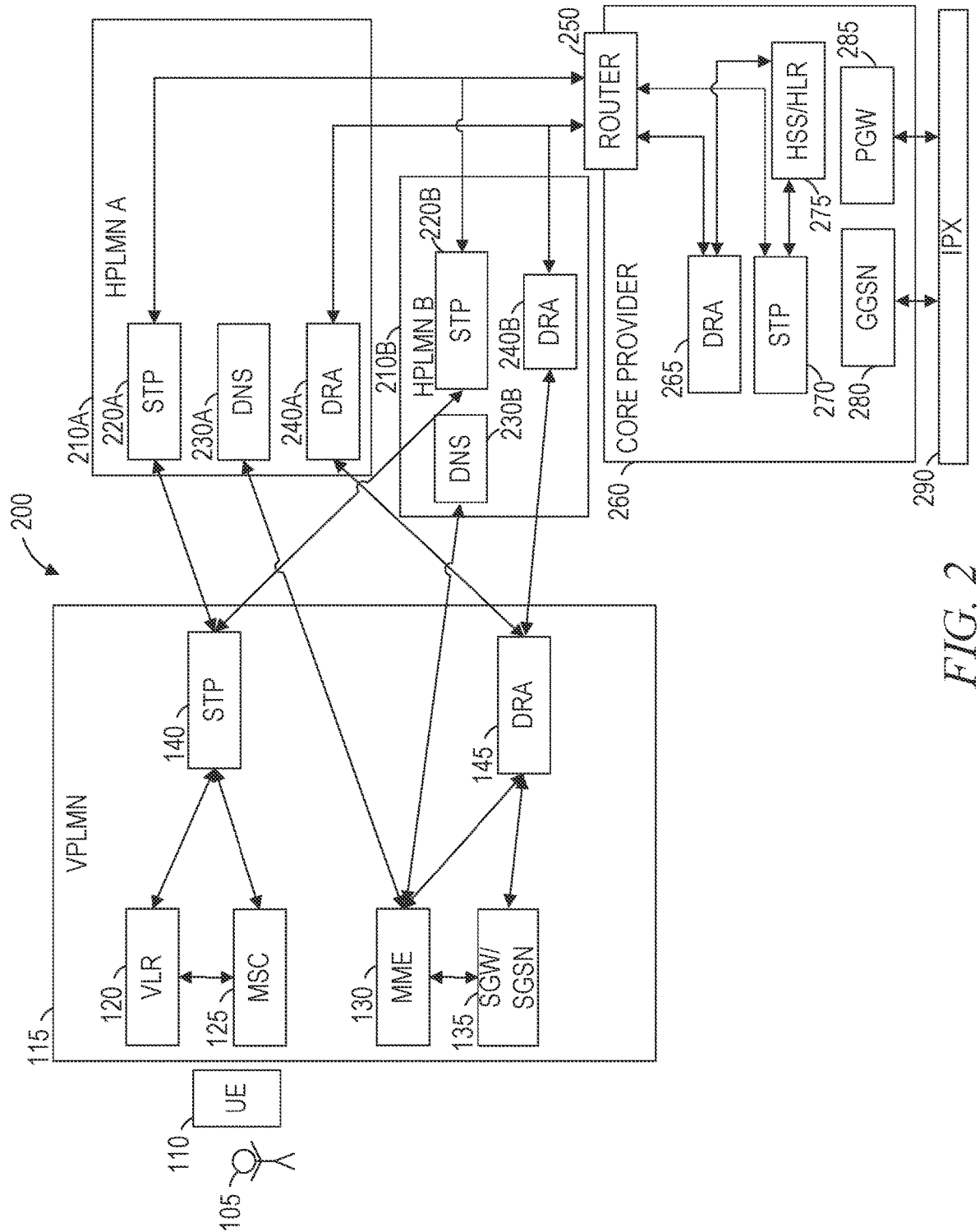
FIG. 2 is an architecture diagram showing communication paths between a user endpoint and a wireless network core provider, according to some example embodiments.

FIG. 2 is an architecture diagram 200 showing communication paths between a user endpoint 110 and a wireless network core provider 260, according to some example embodiments. The architecture diagram 200 is similar to the architecture diagram 100, but shows multiple HPLMNs 210A and 210B and a core provider 260, to which both HPLMNs 210 route traffic. The HPLMNs 210A-210B may be referred to generically as an HPLMN 210, or in the aggregate as HPLMNs 210. Though two HPLMNs 210 are shown in FIG. 2, the VPLMN 115 connects to more or fewer HPLMNs 210 in various example embodiments.

The UE 110 connects to the VPLMN 115. The VPLMN 115 connects to the HPLMN 210A or the HPLMN 210B, selecting between then based on the IMSI (or a portion thereof) of the UE 110. The first three digits of an IMSI indicate the country of the subscriber (e.g., 310 for USA or 460 for China). The following two or three digits indicate the subscriber's service provider (e.g., 310 for AT&T Mobility in the USA or 00 for CMCC in China). Thus, by using the first five or six digits of the IMSI of the UE 110, the particular HPLMN for the subscriber is identified and the traffic for the UE 110 is routed appropriately by the VPLMN 115. The HPLMN 210 either processes the connection itself (as shown in FIG. 1) or routes the traffic for the UE 110 to the core provider 260 (e.g., via a VPN tunnel to the router 250). The user 105, the UE 110, and the VPLMN 115 (including the VLR 120, the MSC 125, the MME 130, the SGW/SGSN 135, the STP 140, and the DRA 145) are described above with respect to FIG. 1.

The core provider 260 comprises the PGW 285, the HSS/HLR 275, the GGSN 280, the DRA 265, and the STP 270. The core provider 260 communicates with the HPLMNs 210 using the router 250, processes data using one or more of a DRA 265, an STP 270, an HSS/HLR 275, a GGSN 280, and a PGW 285.

The DRA 265 and the STP 270 in the core provider 260 allows the core provider 260 to alter the routing of communications. As a result, the core provider 260 may direct traffic according to a user- or customer-specific algorithm. For example, a call-redirection service may be provided by the core provider 260, such that when a first phone number is dialed, the call is instead received at a device having a second phone number. The connection between the core provider 260 and the other end of the connection being established by the UE 110 may be via an IPX 290, a VPN, or any suitable combination thereof.

User data is all the data that the modem (e.g., as directed by an application running on the UE 110) is pushing across the data connections. Some or all of the user data is transparent data. The HPLMN 210 and the core provider 260 do not access the content of transparent data. Nonetheless, just by observing the data, the quality of the connection can be measured and calculated. The maximum bandwidth assigned to this "channel" is known from the establishing of this tunnel and the actual bandwidth can be calculated by measuring the packets across the tunnel. Furthermore, the stream may contain information regarding retransmissions, which is an indication of whether there is packet loss and also, the latency can be calculated, both indicators of the quality of the channel.

Additionally, a portion of the user data may be telemetry data. By providing the client (the UE 110) means of communicating metrics only it can collect, the network can gain insight into statistics that it otherwise cannot obtain. For example, signaling strength is a data point that only the modem knows. As another example, the global positioning system (GPS) coordinates of the device may be sent from the device to get absolute accuracy of the physical location of the device. By enabling the client to push those metrics to the HPLMN 210 or the core provider 260, an even more accurate heat map of the connectivity state can be achieved.

There are several ways of providing the client with means of exchanging telemetry with the HPLMN 210. An easy way is to provide a hypertext transport protocol (HTTP) endpoint and allow the client to push data straight to it. However, this would be, to the VPLMN 115, regular data and if a prioritization has to be made, that data may also be throttled or dropped when it is needed the most. Another way is to establish a separate bearer with a higher priority and push the telemetry data across that channel. A PGW of the HPLMNs 210 can take those packets and push them onto a connection (such as Apache Kafka or AWS Kinesis) without inspecting the actual payload, thus offloading the processing of those packets to another system (e.g., the core provider 260). This ensures that the PGW, a scarce resource within the HPLMN 210, is not wasting cycles on tasks that, to it, is irrelevant.

The UE 110 may be associated with multiple IMSIs and be able to select which IMSI to present to the VPLMN 115. Thus, the UE 110 is able to determine which HPLMN 210 its connections should be forwarded to. The core provider 260, in communication with the UE 110 and both HPLMNS 210A and 210B, can determine which HPLMN 210 the UE 110 should use. For example, based on a roaming cost or latency of each available HPLMN 210, the core provider 260 may instruct the UE 110 to switch IMSIs.

Figure 3:
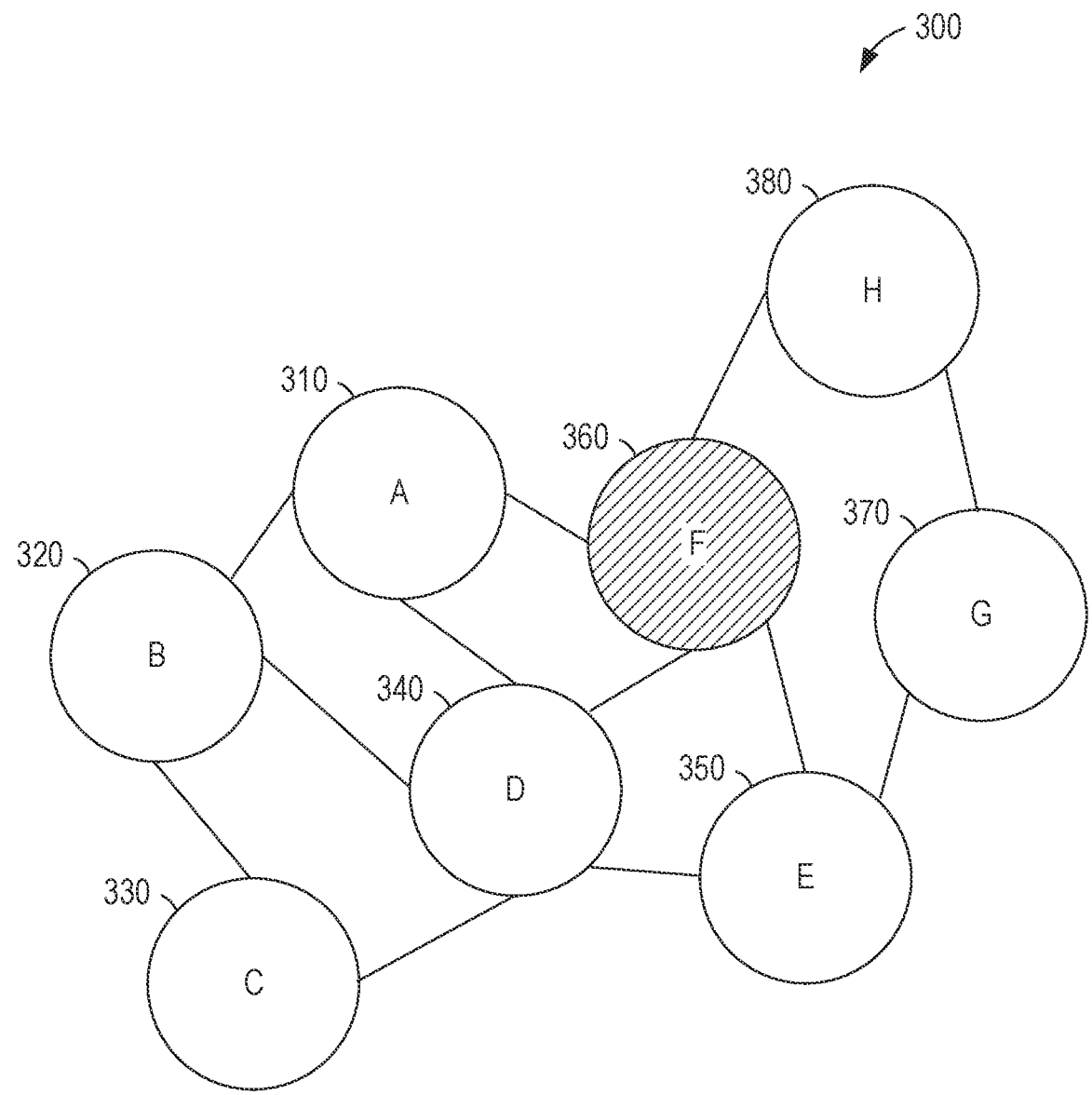
FIG. 3 is a coverage map showing wireless networking coverage by a wireless networking provider, according to some example embodiments.

FIG. 3 is a coverage map 300 showing wireless networking coverage by a wireless networking provider, according to some example embodiments. The coverage map 300 includes areas 310, 320, 330, 340, 350, 360, 370, and 380, connected by routes. The coverage map 300 may be considered as a graph or a digraph, with nodes corresponding to the areas 310-380 and edges corresponding to the routes. Each edge may have a cost that corresponds to a distance or time to travel from one area to another. In a digraph, the cost between two areas may differ depending on the direction.

Each of the areas 310-380 is associated with QoS information. In FIG. 3, the area 360 is associated with a poor QoS, which is indicated by different shading from the areas 310-350 and 370-380. The QoS may be measured by latency, packet loss, data transmission rate, or any suitable combination thereof. In some example embodiments, cost is factored into the QoS value. For example, the area 360 may have equivalent network quality to the other areas, but incur roaming charges. In some example embodiments, the out-of-network (or high cost) areas are removed from the coverage map 300 entirely. Additionally or alternatively, the QoS value of an area may be factored into the cost of edges connecting to the area. For example, each edge connecting two high-QoS regions may be set to a value of 1. Thus, a least-cost path from one region to another will be a path that minimizes the number of regions, which, assuming that each region is approximately the same size, will correspond to a shortest path. Each edge connecting from a high-QoS region to a low-QoS region may be set to a value of 100. Accordingly, the least-cost path will minimize the number of high-QoS regions encountered, even at the cost of increasing the total number of regions by up to 100. Furthermore, the edge value may be set as a continuous function of QoS rather than as a step function, allowing for finer gradation of the tradeoff between distance and QoS.

Figure 12:
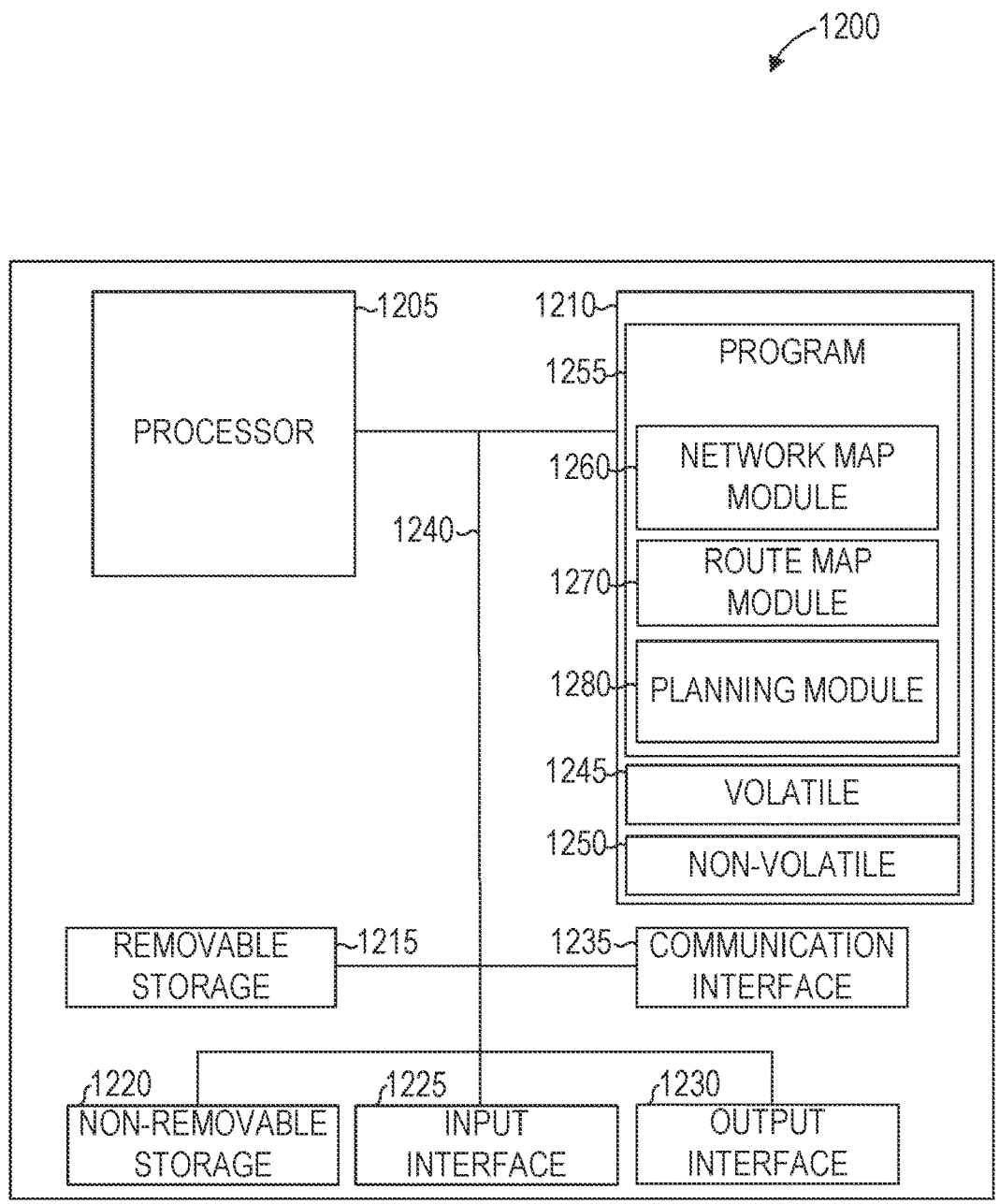
FIG. 12 is a schematic diagram of a computing system suitable for performing one or more methods described herein, according to some example embodiments.

The coverage map 300 may be created by the network map module 1260 of FIG. 12. For example, the network map module 1260 may access, over a network, statistics data for a wireless carrier. In some example embodiments, the statistics data are provided by the core provider 260. For example, the statistics data may be generated by monitoring traffic that passes through the core provider 260 in providing services to a plurality of UEs (e.g., hundreds or thousands of UEs). The monitoring of the traffic for a particular UE may be controlled by a user setting (also referred to as a user preference) for an account associated with the UE. Based on the statistics data, regions of high and low QoS are identified and the coverage map 300 is created accordingly. In some example embodiments, the statistics data comprises network bandwidth associated with a location, packet loss associated with a location, a number of connected devices associated with a location, or any suitable combination thereof.

In some example embodiments, the core provider 260 receives, for each device connection, a QoS profile for the base station. Additionally, the core provider 260 measures the bandwidth of established connections. Some customers may provide additional statistics to the core provider 260. By correlating the data received from many devices, a very accurate, near real-time map of connectivity heuristics are generated for a given geographical area. The data may be further enriched by taking IP connectivity, border gateway protocol (BGP) route change data, real-time transport protocol (RTP) data, simple messaging service (SMS), session initiation protocol (SIP), and voice over LTE (VoLTE) data into account. For example, VoLTE is a service in which voice packets are delivered using IP all the way to the UE 110 over an LIE access network. Thus, the VPLMN 115 does not translate the digital data to a wireless audio transmission before sending the voice packets to the UE 110, reducing latency and processing by the VPLMN 115. Since the VoLTE data from the UE 110 is destined for the core provider 260, analysis of this data may be performed by the core provider 260.

Each of the nodes 310-380 has a certain set of characteristics. Some characteristics are static and others are calculated dynamically. The characteristics of a node can be divided into two main categories: 1) physical capabilities and properties and 2) key performance indicators (KPIs). Physical capabilities and properties include the radio access technologies supported by a cell tower of a region corresponding to the node. For example, a particular cell tower may support 3G and 4G, but not 2G. Also, despite identifying as supporting 4G, it may not support all available bands. These properties are important to track and assign to each node since modern that does not support the same radio access technologies as the cell tower will experience a complete lack of coverage in the region.

The geographic area of a node is fairly static and can be looked up, even though it will change as operators deploy/remove cell towers. Also, the technologies supported by a cell are also quite static. For example, the radio access technology supported by the cell does not change frequently since that requires a physical change to the cell towers. This static information can be updated, based on information received from the UE 110 as it scans areas for available cells and radio access technologies. Also, as a device registers with the network and creates "data channels," the radio access technology will be made available to the HPLMN 210 and the core provider 260. Together, these data points can be used to calculate the physical capabilities and properties of a particular cell.

For each radio access technology the cell is supporting, the KPIs are measured. These KPIs are very dynamic in nature and may change quickly. The KPIs may include: the current and historical bandwidth, the current packet loss, the number of connected devices, or any suitable combination thereof. For each device that is currently connected within a cell, the HPLMN 210 and the core provider 260 is enabled to determine the average throughput of the devices, the access technology it is using and based on that, calculate a value for a corresponding KPI. For example, if the bandwidth suddenly drops, or if the packet loss suddenly increases, that could be an indication that the cell area is having an issue, or perhaps the area is now servicing too many devices and is now running over capacity. Under any of these circumstances, the KPI would go down.

If an area is very busy, it could also be that a device may not even be able to attach. Devices that are static, such as a traffic light, and normally would be attached to the network but no longer is, could be an indication that the area is unusually busy (or having other types of issues). If a single device drops off, it will not affect the model, but if many do, combined they will perhaps score this cell to be "busy" or "degraded."

Thus, for each node, some or all of the following may be tracked: operator name, operator mobile country code (MCC), operation mobile network code (MNC), geographic location (e.g., GPS coordinates), TAI, cell global identifier (CGI), and radio access technologies supported. For each supported radio technology, some or all of the following may be tracked: supported frequency bands, current KPI values, and moving average KPI values. The KPIs may include bandwidth, packet loss, number of connected devices, number of statically connected devices (e.g., immobile devices such as traffic lights), or any suitable combination thereof.

Figure 4:
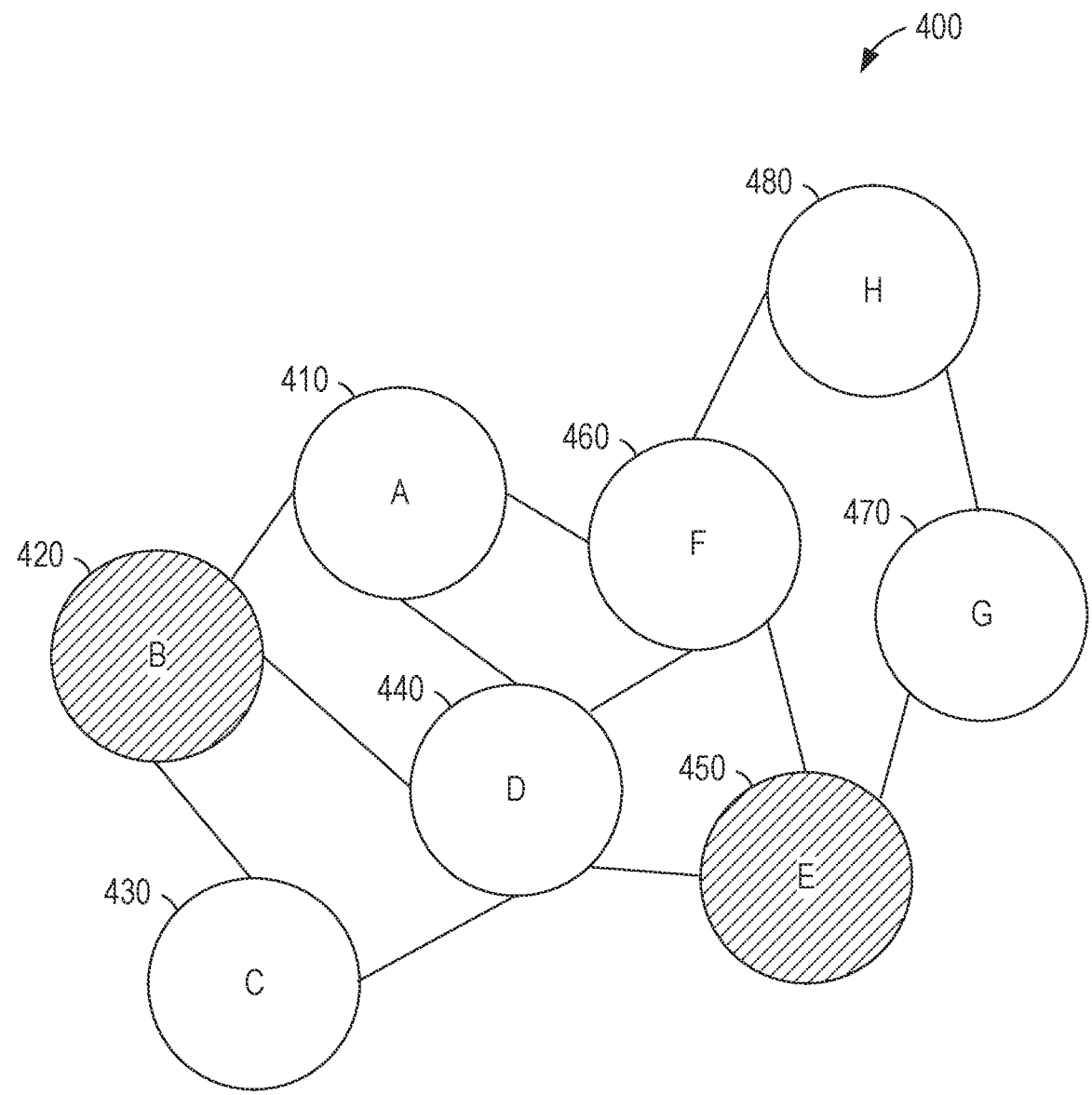
FIG. 4 is a coverage map showing wireless networking coverage by another wireless networking provider, according to some example embodiments.

FIG. 4 is a coverage map 400 showing wireless networking coverage by another wireless networking provider, according to some example embodiments. The coverage map 400 includes areas 410, 420, 430, 440, 450, 460, 340, and 480, connected by routes. The coverage map 400 may be considered as a graph or a digraph, with nodes corresponding to the areas 410-480 and edges corresponding to the routes. Each of the areas 410-480 is associated with QoS information. In FIG. 4, the areas 420 and 450 are associated with a poor QoS, which is indicated by different shading from the areas 410, 430-440, and 460-480. As can be seen by comparison of FIG. 3 with FIG. 4, the two wireless networking providers have different areas with poor QoS. As a result, redirecting network traffic from a UE to different network providers as the UE travels between areas may result in improved QoS for the UE. The coverage map 400 may be created by the network map module 1260 of FIG. 12, based on statistics data gathered from the core provider 260.

Figure 5:
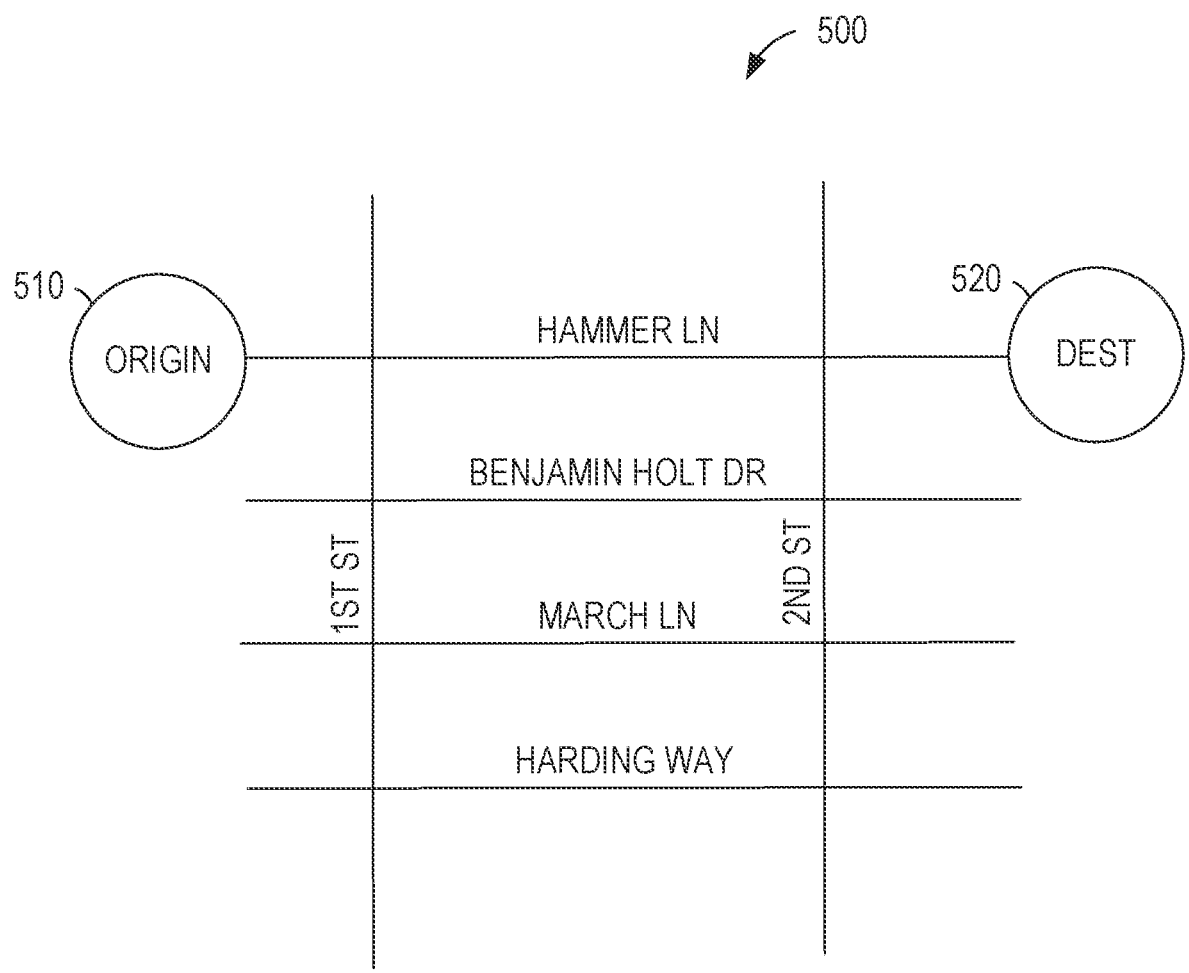
FIG. 5 is a map of a physical region including an origin location and a destination location, according to some example embodiments.

FIG. 5 is a map 500 of a physical region including an origin location 510 and a destination location 520, according to some example embodiments. A path from the origin location 510 to the destination location 520 along the map may be determined by minimizing a cost function (e.g., a cost function based on distance, time, toll roads, or any suitable combination thereof). In this example, the lowest-cost route is a straight line along Hammer Lane.

The map 500 indicates physical paths among the second map further indicates physical paths among the plurality of regions of the coverage map 300, the coverage map 400, other coverage maps of other wireless carriers, or any suitable combination thereof. Thus, by considering the map 500 and one or more coverage maps, a path from the origin location 510 to the destination location 520 may be determined while taking into account the wireless coverage provided by each network carrier.

Figure 6:
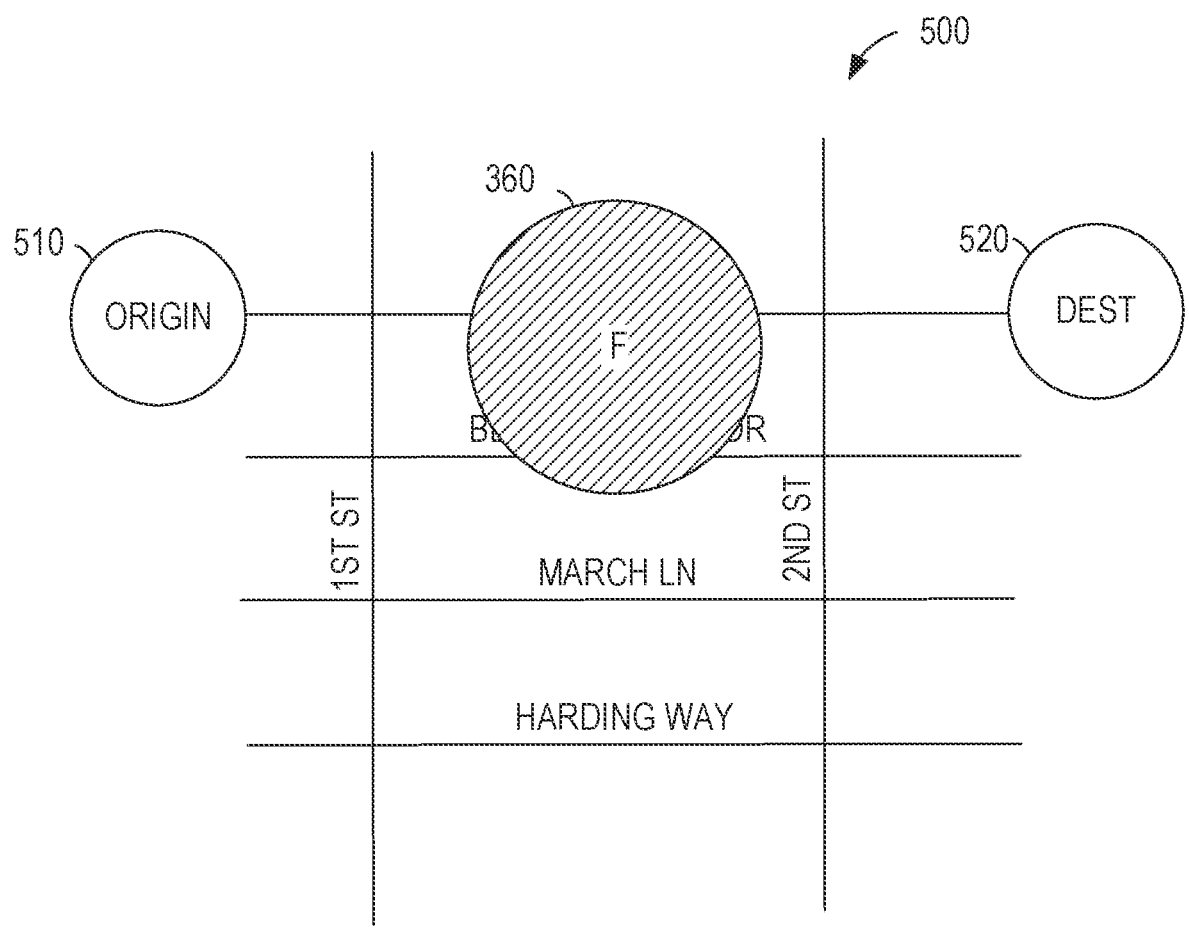
FIG. 6 shows an area of poor coverage by a wireless networking provider superimposed on the map of the physical region.

FIG. 6 shows the area 360 of poor coverage by a wireless networking provider superimposed on the map 500 of the physical region. FIG. 6 also shows the origin location 510 and the destination location 520. The straight-line path along Hammer Lane goes through the area 360. Accordingly, an alternate route using March Lane may be taken to avoid the low QoS area 360 or the networking provider may be switched from the provider of FIG. 3 to the provider of FIG. 4 that does not have a low QoS area along the path from the origin location 510 to the destination location 520. Though not shown in FIG. 6, in this example, the portions of the map 500 not covered by the area 360 are covered by one or more of the areas 310-350 and 370-380. Thus, the coverage map 300 combined with the map 500 shows that the network provider of FIG. 3 has adequate overage of all of the area of the map 500 except for the portion shown covered by area 360 in FIG. 6.

Figure 7:
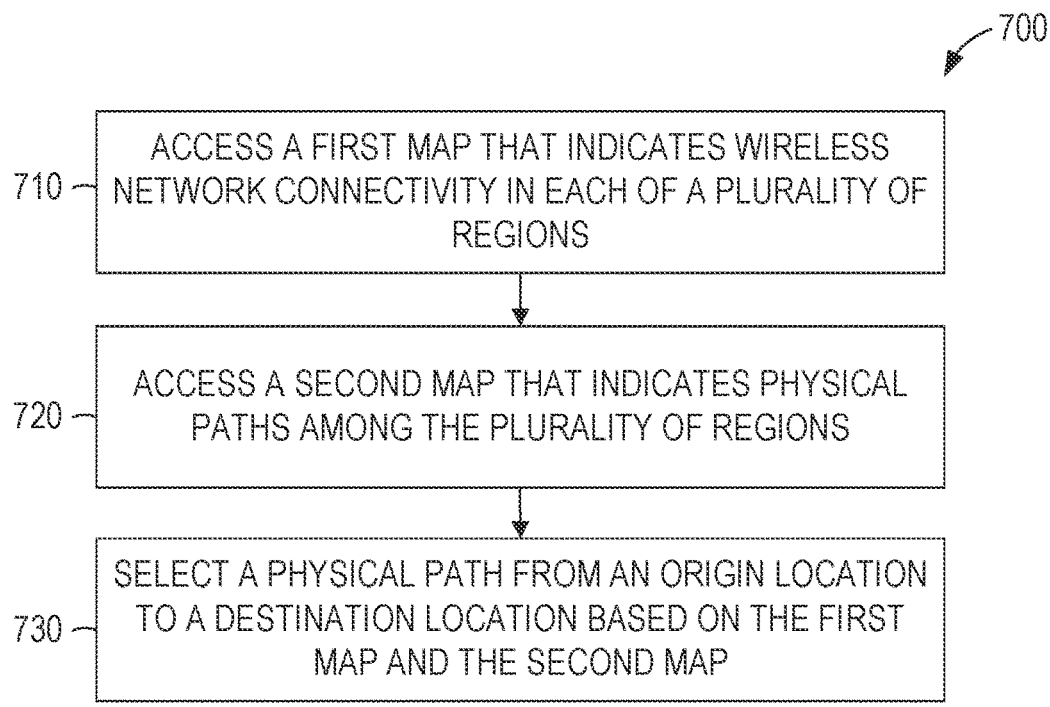
FIG. 7 is a flowchart of a method to select a physical path from an origin location to a destination location, according to some example embodiments.

FIG. 7 is a flowchart of a method 700 to select a physical path from an origin location to a destination location, according to some example embodiments. The method 700 includes operations 710, 720, and 730. By way of example and not limitation, the method 700 is described as being performed by the systems and devices of FIG. 2 (implemented in whole or in part as a computer 1200 as shown in FIG. 12), using the data structures of FIGS. 3-6.

In operation 710, the network map module 1260 accesses a first map that indicates wireless network connectivity in each of a plurality of regions. For example, the UE 110 or a server of the core provider 260 may access the coverage map 300 for wireless network connectivity of a first HPLMN 210A.

The route map module 1270, in operation 720, accesses a second map that indicates physical paths among the plurality of regions. For example, the UE 110 or a server of the core provider 260 may access the map 500 of a physical region. As is discussed above with respect to FIG. 6, the map 500 shows physical paths in an area covered by the regions of the coverage map 300, with varying QoS in each region.

In operation 730, the planning module 1280 selects a physical path from an origin location to a destination location based on the first map and the second map. For example, if the QoS of the area 360 is poor as shown in FIG. 6, the planning module 1280 may select a path from the origin 510 to the destination 520 along March Lane, staying within areas of high QoS. As another example, if the QoS of the area 360 is adequate, the planning module 1280 may select a path from the origin 510 to the destination 520 along Hammer Lane, minimizing the travel time without sacrificing QoS.

As a result of the application of the method 700, the user 105 of the UE 110 is enabled to take an optimal (e.g., a shortest, fastest, least cost, or any suitable combination thereof) path from an origin location to a destination location without sacrificing wireless connectivity quality. This enables the UE 110 to provide connectivity that would be lost had a route been selected without taking into account the wireless connectivity quality, improving the performance of the UE 110.

Figure 8:
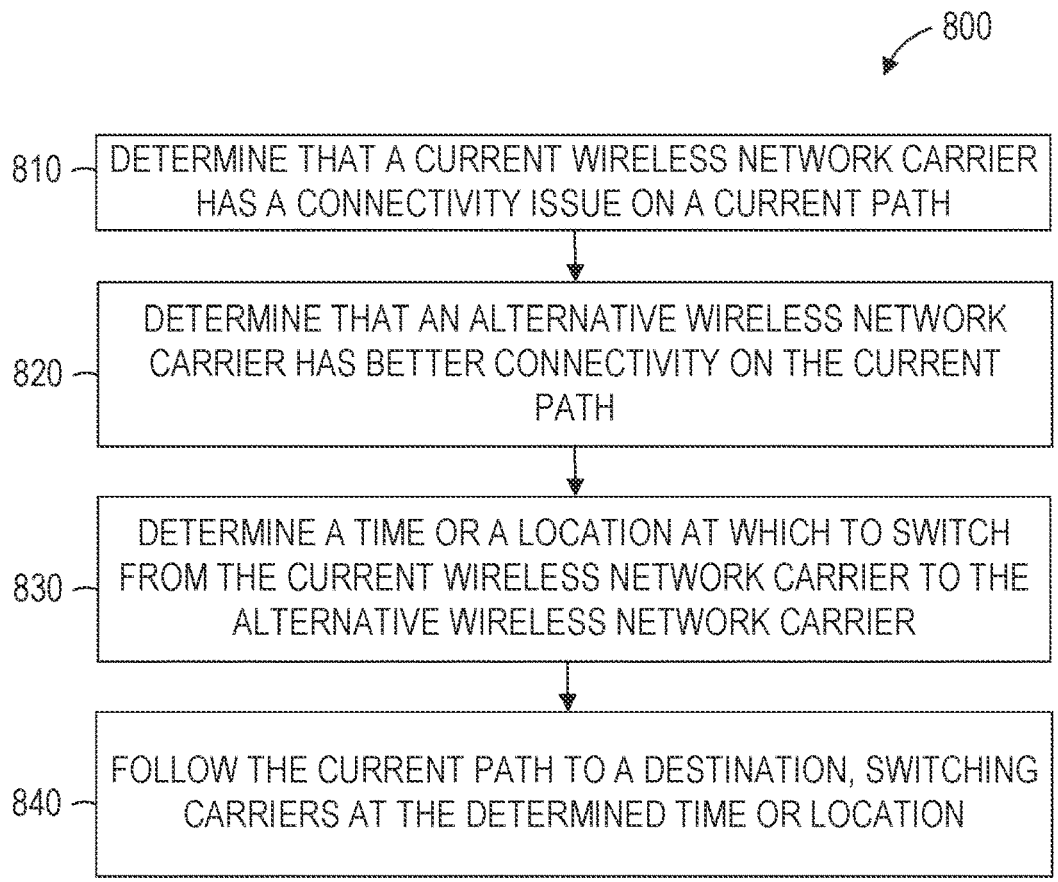
FIG. 8 is a flowchart of a method to change from one wireless network to another while following a physical path from an origin location to a destination location, according to some example embodiments.

FIG. 8 is a flowchart of a method 800 to change from one wireless network to another while following a physical path from an origin location to a destination location, according to some example embodiments. The method 800 includes operations 810, 820, 830, and 840. By way of example and not limitation, the method 800 is described as being performed by the systems and devices of FIG. 2 (implemented in whole or in part as a computer 1200 as shown in FIG. 12), using the data structures of FIGS. 3-6. The method 800 may be performed instead of the method 700 when a request for a path is generated from the UE 110.

In operation 810, the planning module 1280 determines that a current wireless network carrier has a connectivity issue on a current path. For example, the current path may be the shortest route from the origin location 510 to the destination location 520 and, as shown in FIG. 6, the current wireless network carrier has a connectivity issue (in this example, a poor QoS area 360) on the current path.

The planning module 1280 determines, in operation 820, that an alternative wireless network carrier has better connectivity on the current path. For example, the coverage map 400 for an alternative wireless network carrier shows adequate QoS in the area 460, corresponding to the same physical area as the area 360.

In operation 830, the planning module 1280 determines a time or a location at which to switch from the current wireless network carrier to the alternative wireless network carrier. For example, the planning module 1280 may determine to switch network carriers immediately before or after entering the area 360, to switch networks at a time predicted to coincide with entering the area 360, to switch networks at a time in which use of the wireless network traffic is below a predetermined threshold, or any suitable combination thereof. Switching carriers may be accomplished by changing the IMSI of the UE 110, by changing prioritization of carriers, or any suitable combination thereof.

The UE 110, in operation 840, follows the current path to a destination, switching network carriers at the determined time or location. For example, the UE 110 may be a self-driving car that drives to the destination location 520, switching from the wireless service provider of FIG. 3 to the wireless service provider of FIG. 4 at the location or time determined in operation 830.

In some example embodiments, the core provider 260 instructs the UE 110 to change its IMSI to connect to a different HPLMN 210 without any other change in behavior by the UE 110, the VPLMN 115, or the HPLMNs 210A-210B. As a result, the US 110 enjoys improved network connectivity on the path from the origin location 510 to the destination location 520 without consuming additional processing resources to perform the method 800 or requiring modification of the VPLMN 115 or the HPLMNs 210A-210B.

Figure 9:
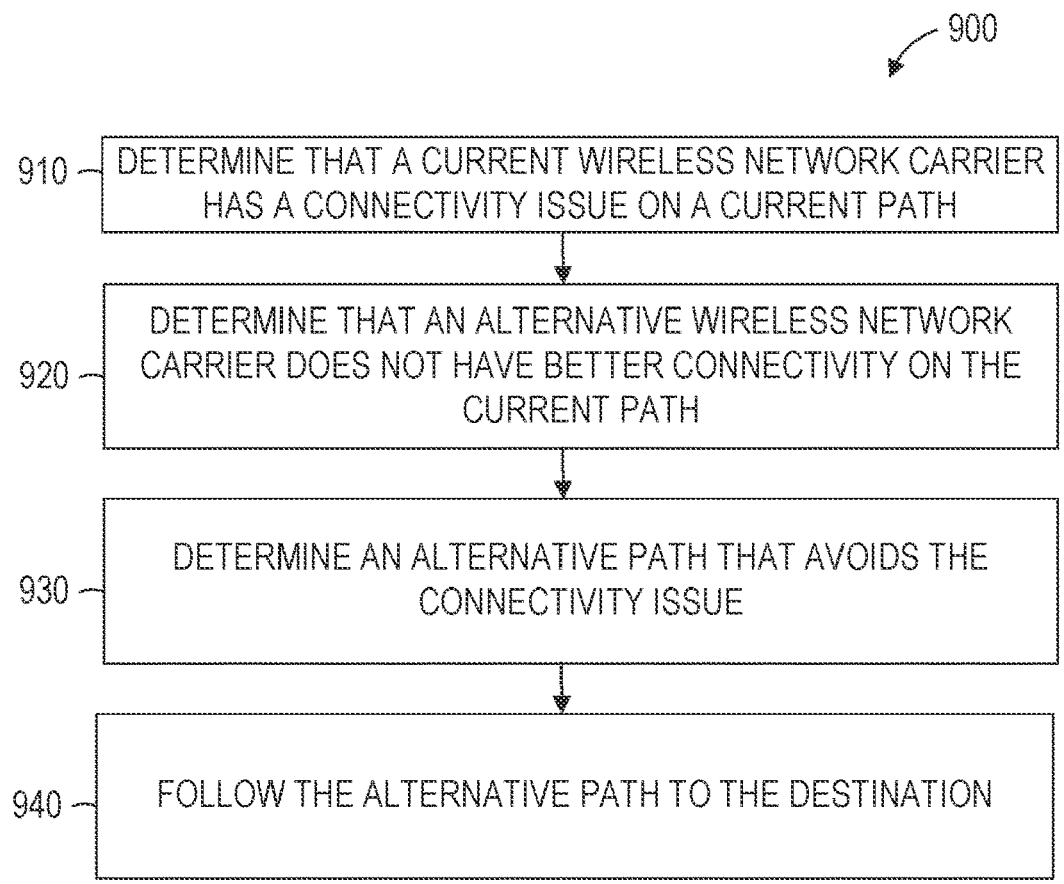
FIG. 9 is a flowchart of a method to change from one physical path to another while travelling from an origin location to a destination location, according to some example embodiments.

FIG. 9 is a flowchart of a method 900 to change from one physical path to another while travelling from an origin location to a destination location, according to some example embodiments. The method 900 includes operations 910, 920, 930, and 940. By way of example and not limitation, the method 900 is described as being performed by the systems and devices of FIG. 2 (implemented in whole or in part as a computer 1200 as shown in FIG. 12), using the data structures of FIGS. 3-6. The method 900 may be performed in combination with or instead of the methods 700 and 800 when a request for a path is generated from the UE 110.

In operation 910, the planning module 1280 determines that a current wireless network carrier has a connectivity issue on a current path (e.g., as in the operation 810, described above with respect to FIG. 8). The planning module 1280 determines, in operation 920, that an alternative wireless network carrier does not have better connectivity on the current path. Thus, in this example, the path from the origin location 510 to the destination location 520 encounters the area 360 with a connectivity issue but the area 460 (contrary to the way it is shown in FIG. 4) also has poor wireless network connectivity.

In operation 930, the planning module 1280 determines an alternative path that avoids the connectivity issue. For example, the planning module 1280 select a path from the origin 510 to the destination 520 along March Lane, staying within areas of high QoS of the current wireless network. The selecting of the physical path may be based on a speed of a vehicle. For example, the speed of the vehicle and the size of the low QoS region may be used to estimate an amount of time that will be spent in the low QoS region. Based on the amount of time and a predetermined threshold (e.g., 1 minute), the planning module 1280 may determine to continue through the low QoS region or go around it. Additionally or alternatively, the selecting of the physical path may be based on modem capabilities of the UE 110. For example, for one UE 110, the method 800 may be performed; for another UE 110 with modem capabilities that preclude connection to the alternative wireless carrier of operation 830, the method 900 may be performed.

The UE 110, in operation 940, follows the alternative path to the destination. As a result of performing the method 900, the UE 110 is enabled to maintain high wireless connectivity along a current path if an alternative network carrier is available and to change paths to maintain high wireless connectivity if no alternative network carrier is available. This improves the functionality of the UE 110 over prior art systems that would simply endure the low network connectivity when passing through the area 360.

Figure 10:
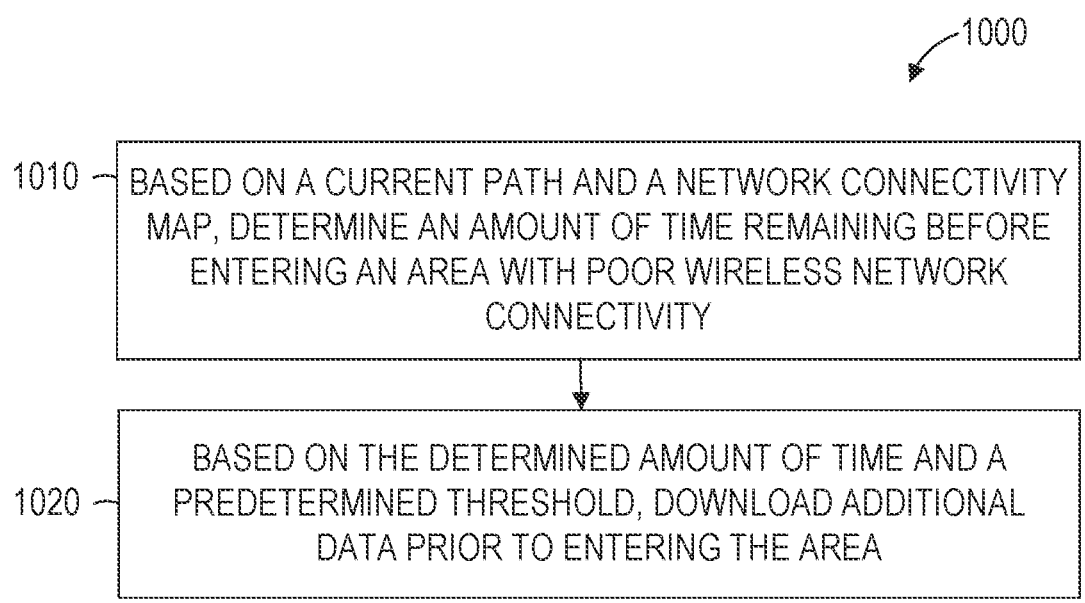
FIG. 10 is a flowchart of a method to download additional data while travelling from an origin location to a destination location, according to some example embodiments.

FIG. 10 is a flowchart of a method 1000 to download additional data while travelling from an origin location to a destination location, according to some example embodiments. The method 1000 includes operations 1010 and 1020. By way of example and not limitation, the method 1000 is described as being performed by the systems and devices of FIG. 2 (implemented in whole or in part as a computer 1200 as shown in FIG. 12), using the data structures of FIGS. 3-6. The method 1000 may be performed in combination with or instead of the methods 700, 800, and 900 when a request for a path is generated from the UE 110.

In operation 1010, the planning module 1280, based on a current path and a network connectivity map, determines an amount of time remaining before entering an area with poor wireless network connectivity. For example, the current path may be the straight-line path from the origin 510 to the destination 520 as shown in FIG. 6, with the area 360 having poor wireless network connectivity. Based on a current rate of travel (e.g., a speed of a vehicle) and other information (e.g., a speed limit, an average rate of travel, a distance from a current location to an edge of the area 360, or any suitable combination thereof), the amount of time remaining before the QoS decreases is determined.

The UE 110, in operation 1020, based on the determined amount of time and a predetermined threshold, downloads additional data prior to entering the area with poor wireless connectivity. For example, when five minutes or less of high QoS remains, additional map data may be downloaded to decrease the probability of being unable to access a plotted route stored on a server while in the area of poor wireless connectivity. In some example embodiments, other network traffic is deprioritized while the additional data is being downloaded. For example, streaming music or video may be halted to free up bandwidth for downloading more critical information that will be used during the predicted period of low QoS. As another example, streaming music or video may be the additional data that is downloaded, such that the increased buffering of the streamed data allows for uninterrupted play while traversing the low QoS region.

The prioritization of traffic for downloading may be controlled based on customer-specified rules. For example, maps may be prioritized over streaming music based on a user preference. In some example embodiments, operation 1020 is replaced or supplemented with a notification message presented to the user 105 by the UE 110. The user is enabled to respond to the notification message by selecting which traffic to prioritize for download prior to entering the area with poor wireless connectivity.

Figure 11:
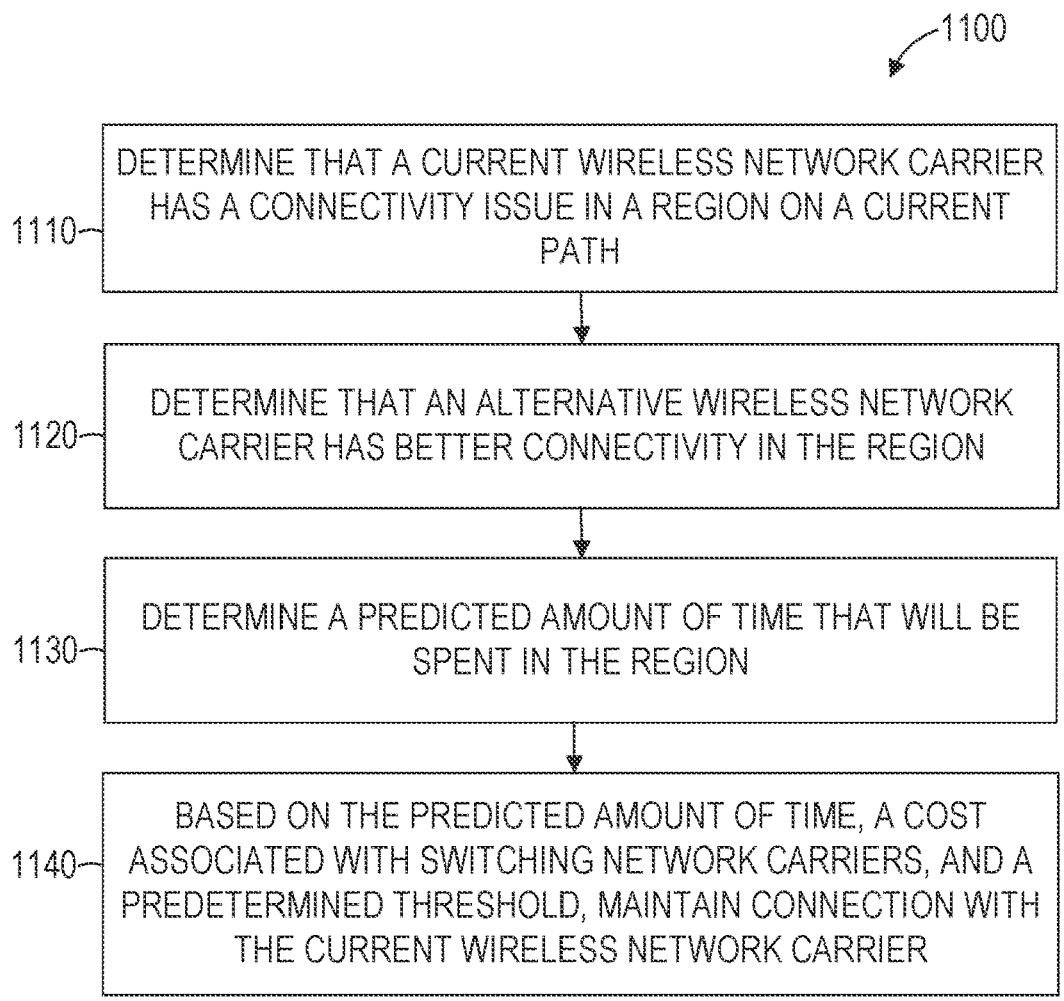
FIG. 11 is a flowchart of a method to maintain a connection to a current wireless network while following a physical path from an origin location to a destination location, according to some example embodiments.

FIG. 11 is a flowchart of a method 1100 to maintain a connection to a current wireless network while following a physical path from an origin location to a destination location, according to some example embodiments. The method 1100 includes operations 1110, 1120, 1130, and 1140. By way of example and not limitation, the method 1100 is described as being performed by the systems and devices of FIG. 2 (implemented in whole or in part as a computer 1200 as shown in FIG. 12), using the data structures of FIGS. 3-6. The method 1100 may be performed in combination with or instead of the methods 700, 800, 900, and 1000 when a request for a path is generated from the UE 110.

In operation 1110, the planning module 1280 determines that a current wireless network carrier has a connectivity issue in a region on a current path. For example, the UE 110 may be a smart car travelling near a border region wherein different wireless network carriers provide connectivity on either side of the border. The current path may take the smart car back and forth across the border, such that the planning module 1280 detects the next border crossing and the corresponding connectivity issue for the current wireless network carrier.

The planning module 1280 determines, in operation 1120, that an alternative wireless network carrier has better connectivity on the current path. For example, the wireless network carrier that provides connectivity on the other side of the border has better connectivity during the portion of the current path that takes place on that side of the border.

In operation 1130, the planning module 1280 determines a predicted amount of time that will be spent in the region that the current wireless network carrier has a connectivity issue. For example, the planning module 1280 may determine, based on a current speed of the smart car, an average speed of vehicles traversing the region, or any suitable combination thereof, an amount of time expected to take to traverse the region. Thus, if the current path will simply to cross the border and maintain a heading farther into the area served by the other wireless network carrier, the predicted amount of time will be large or unbounded (e.g., hours or days). However, if the current path will cross the border only momentarily, the predicted amount of time will be small (e.g., minutes or seconds).

The planning module 1280, in operation 1140, based on the predicted amount of time, a cost associated with switching network carriers, and a predetermined threshold, maintains connection with the current wireless carrier. The cost associated with switching network carriers may be measured in time, currency, or any suitable combination thereof. The predetermined threshold may be defined in time, currency, or any suitable combination thereof. If the cost and threshold are measured in currency, a conversion function may be used to convert them to time or to convert the predicted amount of time to currency.

For example, if the predicted time minus the cost is less than the threshold, the connection with the current wireless carrier is maintained. Thus, if the predicted time is low, the cost high, or the threshold is high, the connection is more likely to be maintained and if the predicted time is high, the cost of switching is low, or the threshold is low, the wireless carrier is more likely to be switched. If the wireless carrier is switched, the operations 830 and 840 may be performed.

The method 1100 may be used to allow a smart car or other mobile EU 104 to tolerate brief losses of wireless connectivity instead of incurring high costs to maintain the connectivity. Alternatively, if the predicted loss of wireless connectivity is substantial, the cost of switching mobile network providers is incurred, allowing the UE 110 to maintain wireless connectivity.

FIG. 12 is a schematic diagram of a computing system 1200 suitable for performing one or more methods described herein, according to some example embodiments. All components need not be used in various embodiments. For example, clients (e.g., the UE 110), servers (e.g., the HSS/HLR 260), autonomous systems, and cloud-based network resources (e.g., the DRAs 145, 170, 240A, 240B, and 265) may each be use a different set of components, or, in the case of servers for example, larger storage devices.

The computer system 1200 includes a processor 1205, a computer-storage medium 1210, removable storage 1215, and non-removable storage 1220, all connected by a bus 1240. Although the example computing device is illustrated and described as the computer system 1200, the computing device may be in different forms in different embodiments. For example, the computing device 1200 may instead be a smartphone, a tablet, a smartwatch, or another computing device including elements the same as or similar to those illustrated and described with regard to FIG. 12. Devices such as smartphones, tablets, and smartwatches are collectively referred to as "mobile devices." Further, although the various data storage elements are illustrated as part of the computer 1200, the storage may also or alternatively include cloud-based storage accessible via a network, such as the Internet, or server-based storage.

The processor 1205 may be a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof. The term "processor" is intended to include multi-core processors that may comprise two or more independent processors (sometimes referred to as "cores") that may execute instructions contemporaneously. Although FIG. 12 shows a single processor 1205, the computer system 1200 may include a single processor with a single core, a single processor with multiple cores (e.g., a multi-core processor), multiple processors with a single core, multiple processors with multiple cores, or any combination thereof.

The computer-storage medium 1210 includes volatile memory 1245 and non-volatile memory 1250. The volatile memory 1245 or the non-volatile memory 1250 stores a program 1255. The computer 1200 may include, or have access to, a computing environment that includes a variety of computer-readable media, such as the volatile memory 1245, the non-volatile memory 1250, the removable storage 1215, and the non-removable storage 1220. Computer storage includes random-access memory (RAM), read-only memory (ROM), erasable programmable read-only memory (EPROM) and electrically erasable programmable read-only memory (EEPROM), flash memory or other memory technologies, compact disc read-only memory (CD ROM), digital versatile disks (DVD) or other optical disk storage, magnetic cassettes, magnetic tape, magnetic disk storage or other magnetic storage devices, or any other medium capable of storing computer-readable instructions embodying any one or more of the methodologies or functions described herein. The instructions may also reside, completely or partially, within the processor 1205 (e.g., within the processor's cache memory) during execution thereof by the computer system 1200.

The computer system 1200 includes or has access to a computing environment that includes an input interface 1225, an output interface 1230, and a communication interface 1235. The output interface 1230 interfaces to or includes a display device, such as a touchscreen, that also may serve as an input device. The input interface 1225 interfaces to or includes one or more of a touchscreen, a touchpad, a mouse, a keyboard, a camera, one or more device-specific buttons, one or more sensors integrated within or coupled via wired or wireless data connections to the computer system 1200, and other input devices. The computer system 1200 may operate in a networked environment using the communication interface 1235 to connect to one or more remote computers, such as database servers. The remote computer may include a personal computer (PC), server, router, network PC, peer device or other common network node, or the like. The communication interface 1235 may connect to a local-area network (LAN), a wide-area network (WAN), a cellular network, a WiFi network, a Bluetooth network, or other networks.

Computer instructions stored on a computer-storage medium (e.g., the program 1255 stored in the computer-storage medium 1210) are executable by the processor 1205 of the computer system 1200. As used herein, the terms "machine-storage medium," "device-storage medium," and "computer-storage medium" (referred to collectively as "machine-storage medium") mean the same thing and may be used interchangeably. The terms refer to a single or multiple storage devices and/or media (e.g., a centralized or distributed key-value store, and/or associated caches and servers) that store executable instructions and/or data, as well as cloud-based storage systems or storage networks that include multiple storage apparatus or devices. The terms shall accordingly be taken to include, but not be limited to, solid-state memories, and optical and magnetic media, including memory internal or external to processors 1205. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such transitory media, at least some of which are covered under the term "signal medium" discussed below. The term "signal medium" or "transmission medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and signal media. Thus, the terms include both storage devices/media and carrier waves/modulated data signals.

The program 1255 may further be transmitted or received over a network using a transmission medium via the communication interface 1235 and utilizing any one of a number of well-known transfer protocols (e.g., HTTP). Examples networks include a local area network (LAN), a wide area network (WAN), the Internet, mobile telephone networks, plain old telephone service (POTS) networks, and wireless data networks (e.g., WiFi, LTE, and WiMAX networks). The term "transmission medium" shall be taken to include any intangible medium that is capable of storing, encoding, or carrying instructions for execution by the computer system 1200, and includes digital or analog communications signals or other intangible media to facilitate communication of such software.

The program 1255 is shown as including a network map module 1260, a route map module 1270, and a planning module 1280. Any one or more of the modules described herein may be implemented using hardware (e.g., a processor of a machine, an application-specific integrated circuit (ASIC), an FPGA, or any suitable combination thereof). Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

The network map module 1260 accesses, creates, stores, or transmits data indicating QoS of one or more wireless networks. For example, data structures in a database corresponding to the maps 300 and 400 may be accessed, created, stored, or transmitted. The route map module 1270 accesses, creates, stores, or transmits geographic maps and routes. For example, data representing the map 500 may be accessed, created stored, or transmitted. The planning module 1280 plans, based on network map and route map data, a route from one location to another. The route may include a transition from one wireless network to another.

In alternative embodiments, the computer system 1200 operates as a standalone device or may be coupled (e.g., networked) to other machines. In a networked deployment, the computer system 1200 may operate in the capacity of a server machine or a client machine in a server-client network environment, or as a peer machine in a peer-to-peer (or distributed) network environment. The computer system 1200 may comprise, but not be limited to, a server computer, a client computer, a personal computer (PC), a tablet computer, a laptop computer, a netbook, a smart phone, a mobile device, a network router, a network switch, a network bridge, or any machine capable of executing instructions of the program 1255, sequentially or otherwise, that specify actions to be taken by the computer system 1200. Further, while only a single computer system 1200 is illustrated, the term "machine" shall also be taken to include a collection of computer systems 1200 that individually or jointly execute the instructions to perform any one or more of the methodologies discussed herein.

The input interface 1225 and the output interface 1230 include components to receive input, provide output, produce output, transmit information, exchange information, capture measurements, and so on. The specific input/output ("I/O") components that are included in a particular computer system 1200 will depend on the type of computer system. For example, portable devices such as mobile phones will likely include a touch input device or other such input mechanisms, while a headless server machine will likely not include such a touch input device. It will be appreciated that the I/O components may include many other components that are not shown in FIG. 12. The input interface 1225 may interface with visual components (e.g., a display such as a plasma display panel, a light emitting diode (LED) display, a liquid crystal display (LCD), a projector, or a cathode ray tube (CRT)), acoustic components (e.g., speakers), other signal generators, and so forth. The input interface 1225 may interface with alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of the methods 700, 800, 900, 1000, and 1100 may be performed by one or more processors. The performance of certain of the operations may be distributed among the one or more processors, not only residing within a single machine, but also deployed across a number of machines. In some example embodiments, the processor or processors may be located in a single location (e.g., within a home environment, an office environment, or a server farm), while in other embodiments the processors may be distributed across a number of locations.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

We claim:

1. A system comprising:
a memory that stores instructions; and
one or more processors configured by the instructions to perform operations comprising:
accessing a path for a mobile device through a plurality of locations;
accessing first data that indicates connectivity of a first provider in each of the plurality of locations, the first provider being a current provider for the mobile device;
accessing second data that indicates connectivity of a second provider in each of the plurality of locations;
based on the first data, the second data, and the path, determining that the second provider has better connectivity in a location of the plurality of locations, the location being on the path for the mobile device;
determining a predicted amount of time that the mobile device will spend in the location; and
based on the predicted amount of time, maintaining connection with the first provider in the location.

2. The system of claim 1, wherein the operations further comprise:
accessing, over a network and based on a user preference, statistics data; and
creating, by the one or more processors, the first data based on the statistics data.

3. The system of claim 2, wherein the statistics data comprises network bandwidth associated with the location.

4. The system of claim 2, wherein the statistics data comprises packet loss associated with the location.

5. The system of claim 2, wherein the statistics data comprises a number of connected devices associated with the location.

6. The system of claim 1, wherein the operations further comprise:
based on the predicted amount of time and a predetermined threshold, downloading additional data prior to entering the location.

7. The system of claim 6, wherein the additional data is additional data related to the second data.

8. A method comprising:
accessing, by one or more processors, a path for a mobile device through a plurality of locations;
accessing, by the one or more processors, first data that indicates connectivity of a first provider in each of the plurality of locations, the first provider being a current provider for the mobile device;
accessing second data that indicates connectivity of a second provider in each of the plurality of locations;
based on the first data, the second data, and the path, determining that the second provider has better connectivity in a location of the plurality of locations, the location being on the path for the mobile device;
determining a predicted amount of time that the mobile device will spend in the location; and
based on the predicted amount of time, maintaining connection with the first provider in the location.

9. The method of claim 8, further comprising:
accessing, over a network and based on a user preference, statistics data; and creating, by the one or more processors, the first data based on the statistics data.

10. The method of claim 9, wherein the statistics data comprises network bandwidth associated with the location.

11. The method of claim 9, wherein the statistics data comprises packet loss associated with the location.

12. The method of claim 9, wherein the statistics data comprises a number of connected devices associated with the location.

13. The method of claim 8, further comprising:
based on the predicted amount of time and a predetermined threshold, downloading additional data prior to entering the location.

14. The method of claim 13, wherein the additional data is additional data related to the second data.

15. A non-transitory machine-readable medium that stores instructions which, when executed by one or more processors, cause the one or more processors to perform operations comprising:
accessing a path for a mobile device through a plurality of locations;
accessing first data that indicates connectivity of a first provider in each of the plurality of locations, the first provider being a current provider for the mobile device;
accessing second data that indicates connectivity of a second provider in each of the plurality of locations;
based on the first data, the second data, and the path, determining that the second provider has better connectivity in a location of the plurality of locations, the location being on the path for the mobile device;
determining a predicted amount of time that the mobile device will spend in the location; and
based on the predicted amount of time, maintaining connection with the first provider in the location.

16. The non-transitory machine-readable medium of claim 15, wherein the operations further comprise:
accessing, over a network and based on a user preference, statistics data; and
creating the first data based on the statistics data.

17. The non-transitory machine-readable medium of claim 16, wherein the statistics data comprises network bandwidth associated with the location.

18. The non-transitory machine-readable medium of claim 16, wherein the statistics data comprises packet loss associated with the location.

19. The non-transitory machine-readable medium of claim 16, wherein the statistics data comprises a number of connected devices associated with the location.

20. The non-transitory machine-readable medium of claim 15, wherein the operations further comprise:
based on the predicted amount of time and a predetermined threshold, downloading additional data prior to entering the location.

* * * * *